(12) United States Patent
Lewis (10) Patent No.: US 11,033,867 B2
(45) Date of Patent: *Jun. 15, 2021

(54) AQUEOUS LIGNIN AND HEMICELLULOSE DISPERSION

(71) Applicant: Sustainable Fiber Technologies, LLC, Renton, WA (US)

(72) Inventor: Mark Lewis, Renton, WA (US)

(73) Assignee: Sustainable Fiber Technologies, LLC, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,683

(22) Filed: Sep. 26, 2018

(65) Prior Publication Data

US 2019/0091643 A1 Mar. 28, 2019

Related U.S. Application Data

(60) Provisional application No. 62/563,733, filed on Sep. 27, 2017.

(51) Int. Cl.
| | | |
|---|---|---|
| *B01F 17/00* | (2006.01) | |
| *C08L 97/00* | (2006.01) | |
| *C08L 5/14* | (2006.01) | |

(52) U.S. Cl.
CPC ...... *B01F 17/0092* (2013.01); *B01F 17/0028* (2013.01); *C08L 5/14* (2013.01); *C08L 97/005* (2013.01); *C08L 2201/54* (2013.01)

(58) Field of Classification Search
CPC .......................... C08L 97/005; C08L 2201/54
See application file for complete search history.

(56) References Cited

U.S. PATENT DOCUMENTS

| | | | |
|---|---|---|---|
| 2,592,983 A | 4/1952 | Von Hilderbrandt | |
| 4,372,811 A | 2/1983 | Samuelson et al. | |
| 4,698,225 A | 10/1987 | Morrison | |
| 4,728,393 A | 3/1988 | Peel | |
| 4,746,449 A | 5/1988 | Peel | |
| 4,786,438 A | 11/1988 | Blackmore | |
| 4,824,588 A | 4/1989 | Lin | |
| 4,871,825 A | 10/1989 | Lin | |
| 4,952,415 A | 8/1990 | Winowiski et al. | |
| 4,988,520 A | 1/1991 | Overton | |
| 4,996,065 A | 2/1991 | Van de Walle | |
| 5,010,156 A * | 4/1991 | Cook ..................... | C08G 14/14 527/403 |
| 5,281,434 A | 1/1994 | Winowiski et al. | |
| 5,312,632 A | 5/1994 | Simsa et al. | |
| 5,595,628 A | 1/1997 | Gordon et al. | |
| 5,786,007 A | 1/1998 | Webb | |
| 5,714,184 A | 2/1998 | Major | |
| 6,013,116 A | 1/2000 | Major et al. | |
| 6,113,974 A | 9/2000 | Winowiski et al. | |
| 6,464,827 B1 * | 10/2002 | Colodette ............. | D21C 3/022 162/63 |
| 6,506,318 B1 | 1/2003 | Sapienza et al. | |
| 6,605,232 B1 | 8/2003 | Montgomery et al. | |
| 7,070,709 B2 | 7/2006 | Schilling | |
| 7,514,018 B2 | 4/2009 | Schilling | |
| 8,268,121 B2 | 9/2012 | Blount | |
| 8,574,631 B2 | 11/2013 | Anderson | |
| 9,133,378 B2 | 9/2015 | Maslow | |
| 2003/0156970 A1 | 8/2003 | Oberkofler et al. | |
| 2005/0247907 A1 | 11/2005 | Sapienza et al. | |
| 2006/0202156 A1 | 9/2006 | Sapienza et al. | |
| 2008/0121356 A1 * | 5/2008 | Griffith .............. | D21C 11/0085 162/16 |
| 2009/0314983 A1 | 12/2009 | Sapienza et al. | |
| 2011/0003352 A1 | 1/2011 | Retsina | |
| 2012/0108798 A1 | 5/2012 | Wenger et al. | |
| 2013/0175467 A1 | 7/2013 | Bradt et al. | |
| 2013/0217868 A1 * | 8/2013 | Fackler .................... | C07G 1/00 530/507 |
| 2014/0249271 A1 * | 9/2014 | Pietarinen ................ | C08H 6/00 524/799 |
| 2014/0288285 A1 * | 9/2014 | Ters ......................... | C07G 1/00 530/500 |
| 2014/0315254 A1 * | 10/2014 | Gao ........................ | C07G 1/00 435/72 |

(Continued)

FOREIGN PATENT DOCUMENTS

| | | |
|---|---|---|
| CA | 2434215 A1 | 1/2004 |
| CA | 2760840 | 3/2011 |

(Continued)

OTHER PUBLICATIONS

Pan et al. (Biotechnology and Bioengineering, vol. 94, No. 5, Aug. 5, 2006, p. 851-861) (Year: 2006).*
"Isolation and Characterization of organosolv lignin under alkaline condition form wheat straw" (J. M. Lawther, R. C. Sun, W. B. Banks, Int. J. of Polymer Analysis and Characterization, 3:2, 159-175 (1997).
Lindner, Albert and Wegener, Gerd, Charcterization of Lignins from Organosolv Pulping According to the Organocell Process Part 1. Elemental Analysis, Nonlignin Portions and Functional Groups, Journal of Wood Chemistry and Technology, vol. 8, 1988—Issue 3, Dec. 13, 2006.

(Continued)

*Primary Examiner* — Liam J Heincer (74) *Attorney, Agent, or Firm* — Emerson, Thomson & Bennett, LLC; Roger D. Emerson; Peter R. Detorre (57) ABSTRACT

A stable aqueous dispersion of solids in a liquid medium includes from 10 to 50 weight % (or 10 to 40 or 15 to 35 or 20 to 35 weight %), with respect to the total weight of the composition, of solids comprising a mixture of condensed and non-condensed lignin in an amount of at least 10 weight % (or 20 or 30 or 40 or 50 weight %) of the solids, and hemicellulose in an amount of at least 1 weight % (or 5 or 10 or 20 or 30 or 40 weight %) of the solids, in a substantially aqueous liquid medium.

8 Claims, 2 Drawing Sheets

(56) References Cited

U.S. PATENT DOCUMENTS

| | | | | |
|---|---|---|---|---|
| 2014/0316162 A1* | 10/2014 | Gao | ............. | C12P 19/00 562/589 |
| 2014/0329999 A1* | 11/2014 | Friedl | ............. | C07G 1/00 530/500 |
| 2015/0122429 A1* | 5/2015 | Dybov | ............. | D21C 3/00 162/14 |
| 2015/0203774 A1 | 7/2015 | Lake | | |
| 2016/0229880 A1* | 8/2016 | Pietarinen | ............. | C08H 6/00 |
| 2016/0237194 A1* | 8/2016 | Pietarinen | ............. | C08H 6/00 |
| 2016/0257791 A1* | 9/2016 | Pietarinen | ............. | C07G 1/00 |
| 2017/0226330 A1* | 8/2017 | Knudsen | ............. | C12P 19/14 |
| 2018/0002451 A1* | 1/2018 | Ge | ............. | C08J 9/08 |
| 2019/0062508 A1* | 2/2019 | Winsness | ............. | C08L 97/005 |
| 2019/0153280 A1* | 5/2019 | Lewis | ............. | C09K 3/185 |
| 2019/0161678 A1* | 5/2019 | Lewis | ............. | C09K 17/50 |

FOREIGN PATENT DOCUMENTS

| | | |
|---|---|---|
| CA | 2936029 | 7/2015 |
| CN | 1042743 | 6/1990 |
| CN | 1438385 | 8/2003 |
| CN | 102746052 | 10/2012 |
| CN | 102704296 | 6/2014 |
| CN | 104628482 | 2/2015 |
| CN | 105130682 | 12/2015 |
| CN | 106495847 | 3/2017 |
| CN | 107382500 | 11/2017 |
| CN | 107417428 | 12/2017 |
| DE | 102009051884 | 5/2011 |
| EP | 2831088 | 2/2018 |
| FR | 2673941 | 9/1992 |
| WO | 2002037981 | 5/2002 |
| WO | 20120137204 | 10/2012 |
| WO | 20140124401 | 8/2014 |
| WO | 2015023580 | 2/2015 |
| WO | 2015104296 | 7/2015 |

OTHER PUBLICATIONS

Sun, Run-Cang and Lawther, J. Mark. "Isolation and Characterization of Organosolv Lignins from Wheat Straw". School of Agricultural and Firest Sciences University of Wales, Bangor, Gwynedd, UK, Wood and Fiber Science, 30(1) 1998 pp. 56-63, 1998 Society of Wood Science and Technology.

Lora, Jairo. "Monomers, Polymers and Composites from Renewable Resources", "Chapter 10—Industrial Commercial Lignins: Sources, Properties and Applications" 2008, pp. 225-241.

Lora, J.H. "Lignin Properties and Materials", "Chapter 23—Characteristics and Potential Applications of Lignin Produced by an Organosolv Pulping Process", 1989 American Chemical Society, pp. 312-323.

Nitsos, Christos, "Organosolv Fractionation of Softwood Biomass for Biofuel and Biorefinery Applications", Energies MDPI, Published Dec. 27, 2017.

International Search Report and Written Opinion for PCT App. No. PCT/US2020/039844 dated Oct. 22, 2020.

International Search Report and Written Opinion for PCT App. No. PCT/US2020/039858 dated Oct. 21, 2020.

\* cited by examiner

AQUEOUS LIGNIN AND HEMICELLULOSE DISPERSION

I. BACKGROUND

A. Technical Field

The present disclosure relates generally to compositions comprising lignin and hemicellulose byproducts of cellulose production and dispersions thereof.

B. Description of the Related Art

Tremendous growth in the use and production of cellulose derived from wood and non-wood plant species has led to considerable interest in ways to dispose of or otherwise use the lignin and hemicellulose byproducts that result from pulp processing. In many cases, the lignin and hemicellulose is dissolved by one more liquids, often under heat and mechanical agitation. In some processes, enzymes may be used to break wood and non-wood into its component parts. The liquid/solids mixture that flows from the cellulose manufacturing process is often referred to as black liquor and represents some combination of chemicals and fluids used to separate the cellulose fiber from the lignin and hemicellulose constituents as well as the lignin, hemicellulose and other generally non-cellulosic fractions of the source material.

Typically the black liquor is burned in the processing facility to generate heat for use in the facility. More and more, black liquors are being treated and filtered to recycle the fluid components and separate the solid components for use in a variety of applications, including as starting materials for development of polymers. Depending on the process employed, the structure of the resultant black liquor can vary widely. Processes that employ sulfur chemistries yield liquors having high levels of sulfur. In view of the environmental concerns surrounding excess sulfur and the expense associated with removing sulfur, alternative chemistries which do not rely on sulfur have been developed. Some employ anthraquinone, which has more recently been identified and restricted for its potentially carcinogenic impact. Other processes employ high levels of one or more alcohols as the fluid component. In some applications, the presence of these potentially flammable materials is highly undesired.

Nevertheless, there is still considerable interest in devising new materials and compositions that use the non-cellulosic byproducts of pulp processing. The present invention is directed to an environmentally preferred, stable alkaline dispersion of non-cellulosic byproducts of pulp processing, namely lignin and hemicellulose, in a liquid medium. The compositions of the presently taught dispersion are selected for at least one of reduced environmental impact, improved stability, and improved chemical reactivity.

III. SUMMARY

According to one embodiment, a stable aqueous dispersion comprises:
from 10 to 50 weight % (or 10 to 40 or 15 to 35 or 20 to 35 weight %), with respect to the total weight of the composition, of solids stably dispersed in a liquid medium;
wherein the solids comprise:
lignin in an amount of at least 10 weight % (or 20 or 30 or 40 or 50 weight %) of the solids, and
hemicellulose in an amount of at least 1 weight % (or 5 or 10 or 20 or 30 or 40 weight %) of the solids,
wherein the liquid medium comprises
a. water, and
b. less than 5% by volume (or 2.5 or 1% by volume) with respect to the liquid medium of a C1-C10 alcohol,
wherein the dispersion comprises less than 500 parts per million (ppm) (or 200, or 100 or 50 ppm) of sulfur, and
wherein the dispersion has a pH in the range of 8.0 to 11.

According to another embodiment, the lignin portion of the solids may comprise less than 90 weight % (or 80 or 70 weight %) of condensed oligomers and/or condensed polymers and blends thereof, and at least 10% weight % (or 20 or 30 weight %) or greater of uncondensed lignin monomers and/or non-condensed oligomers and/or non-condensed polymers and blends thereof. In further embodiments, the lignin portion of the solids may comprise at least 10 weight % (or 11 or 12 or 13 or 14 or 15 or 16 or 17 or 18 or 19 or 20 weight percent) of uncondensed lignin monomers and/or non-condensed oligomers and/or non-condensed polymers and blends thereof. In other embodiments, the lignin portion of the solids may comprise from about 10 weight % to about 25 weight percent of uncondensed lignin monomers and/or non-condensed oligomers and/or non-condensed polymers and blends thereof.

According to yet another embodiment, the total lignin content of the dispersion including both the solids and liquors lignin content may comprise less than 100 weight % (or 90 or 80 or 70 weight %) of condensed oligomers and/or condensed polymers and blends thereof.

According to another embodiment, the solids may comprise less than 5 weight % (or 2.5 or 1 or 0.5 weight %) of any of the monosaccharides selected from the group of xylose, mannose, galactose, rhamnose, and arabinose or alternatively, of any monosaccharide. In further embodiments, the solids may comprise no monosaccharides or substantially no monosaccharides selected from the group of xylose, mannose, galactose, rhamnose, and arabinose or alternatively, of any monosaccharide.

According to an embodiment, at least 90 weight % (or 95 or 97 or 98 or 99 weight % or substantially all) of the solids may be derived from a non-wood source.

According to another embodiment, the non-wood source may comprise wheat straw, rice straw, barley straw, oat straw, rye grass, coastal bermuda grass, arundo donax, miscanthus, bamboo, sorghum, banana harvest residue, pineapple residue, nut shell waste, sugarcane bagasse, industrial hemp, recreational cannabis waste, kenaf, switchgrass, succulents, alfalfa, corn stover, and flax straw.

According to another embodiment, the dispersion may be substantially free of anthraquninone (anthracenedione).

According to yet another embodiment of the invention, the dispersion may comprise a liquor byproduct of cellulose pulp processing.

Still other aspects and features of the invention are described in further detail below.

V. DETAILED DESCRIPTION

According to the present invention, a dispersion comprises the stable mixture of solids dispersed or suspended in a liquid medium, wherein the solids comprise a blend of lignin and hemicellulose, and the liquid medium comprises water and optionally an alcohol. For purposes herein, the term "hemicellulose" refers to the polysaccharides and oligosaccharides from wood and non-wood sources.

The dispersion contains no monosaccharides or in certain embodiments may be described as being substantially free of monosaccharides. Monosaccharides, if present within the dispersion, are present in amounts of less than 5 weight percent, less than 2.5 weight percent, less than 1 weight percent or less than 0.5 weight percent.

In one embodiment, the dispersion comprises, on a weight percent basis with respect to the total dispersion, from 10 to 50 weight percent solids suspended in the liquid medium. For purposes herein, the term "stably dispersed" means that not more than 2.0 weight percent of the suspended solids will separate from the liquid medium over a 24-hour period at 25° C. without stirring or agitation. In one embodiment, the dispersion may comprise from 10 to 40 or 15 to 35 or 20 to 35 weight percent solids and in another embodiment, at least 15 weight % solids and in still another embodiment, at least 20 weight % solids.

Solids

In one embodiment, the solids of the present invention comprise a blend of lignin and hemicellulose. The solids may also comprise varying amounts of inorganic minerals. The lignin component of the solids may be derived from any of a variety of wood and non-wood sources through a number of processes to separate lignin from cellulose pulp. The distinction between wood and non-wood sources of lignin is known in the art and is not further delineated herein. In a particularly useful embodiment, the lignin may be derived from a non-wood source. In another embodiment, greater than 80 or 85 or 90 or 95 or 99 weight % of the lignin may be derived from a non-wood source. In still a further embodiment, substantially all of the lignin may be derived from a non-wood source. Particularly useful non-wood sources of lignin may include agricultural products and grasses and may include species such as wheat straw, rice straw, barley straw, oat straw, rye grass, coastal bermuda grass, arundo donax, miscanthus, bamboo, sorghum, banana harvest residue, pineapple residue, nut shell waste, sugarcane bagasse, industrial hemp, recreational cannabis waste, kenaf, switchgrass, succulents, alfalfa, corn stover, and, flax straw. Lignin from wood sources may include lignin derived from hardwood and softwood species.

Lignin may be provided in the form of condensed lignin oligomers/polymers and/or noncondensed lignin monomers/oligomers/polymers.

In some embodiments of the invention, the lignin component of solids in a dispersion comprises less than 90 weight % (or 80 or 70 weight %) of condensed oligomers, condensed polymers and blends thereof and 10% weight % (or 20 or 30 weight %) or greater of non-condensed monomers, oligomers and polymers.

It is known that heating native, non-condensed lignin units to temperatures greater than about 150° C. may cause an increase in the units to undergo condensation type reactions, such as diphenylmethane type condensation. Accordingly, the measure of condensed and noncondensed lignin units in a dispersion sample may be determined on the basis of a dispersion sample measured at a temperature of less than about 120° C.

Native non-wood lignin is of lower molecular weight than wood lignin. Since the non-wood lignin does not undergo extensive condensation reactions, the lignin molecular weight is typically lower than wood sources. Typical lignosulfonates range from 1000-200,000 Da, where as kraft lignin is often 2500-39,000 Da. Non-wood lignin derived from the soda pulping process is reported to have molecular weights 7000-8500 Da. The lignin contained within this dispersion is typically between 600-1500 Da. See Lora, J. 2008 "Industrial Commercial Lignin: Sources," In: Properties and Applications. *Monomers, Polymers and Composites from Renewable Resources*, Elsevier Science. pp. 225-241; Lebo, S. E., Bråten, S. M., Fredheim, G. E., Lutnaes, B. F., Lauten, R. A., Myrvold, B. O., McNally, T. J. 2008 "Recent Advances in the Characterization of Lignosulfonates". In: *Characterization of lignocellulosic materials*, Blackwell Publishing. pp 189-205. Both Lora and Lebo are herein incorporated by reference in their entireties.

The solids of the present invention will further comprise hemicellulose, that is, polysaccharides and oligosaccharides derived from wood or non-wood sources. For purposes herein, the term hemicellulose does not include monosaccharides. The hemicellulose component of the solids may be derived from any of a variety of wood and non-wood sources through a number of processes used to separate hemicellulose from cellulose pulp. The distinction between wood and non-wood sources of hemicellulose is known in the art and is not further delineated herein. In a particularly useful embodiment, the hemicellulose may be derived from a non-wood source. In another embodiment, greater than 80 or 85 or 90 or 95 or 99 weight % of the hemicellulose may be derived from a non-wood source. In still a further embodiment, substantially all of the hemicellulose may be derived from a non-wood source. Particularly useful non-wood sources of hemicellulose may include agricultural products and grasses and may include species such as wheat straw, rice straw, barley straw, oat straw, rye grass, coastal bermuda grass, arundo donax, miscanthus, bamboo, sorghum, banana harvest residue, pineapple residue, nut shell waste, sugarcane bagasse, industrial hemp, recreational cannabis waste, kenaf, switchgrass, succulents, alfalfa, corn stover, and, flax straw. Hemicellulose from wood sources may include hemicellulose derived from hardwood and softwood species.

In one embodiment, the hemicellulose and lignin may be derived from the same source, which may be a non-wood or wood source or blend thereof.

In one embodiment, the solids may comprise lignin in an amount of 10 weight % (or 20 or 30 or 40 or 50 weight %) of the solids, and hemicellulose in an amount of at least 1 weight % (or 5 or 10 or 20 or 30 or 40 weight %) of the solids. These values are based on the total solid content including inorganics. Inorganics may contribute from about 20 to about 50 weight percent to the solid component of the composition and in certain cases may contribute from about 30 to about 35 weight percent to the solid component of the composition.

As mentioned above, the dispersion is substantially free of monosaccharides. By "substantially free", it is meant that the solids may comprise less than 5 weight % (or 2.5 or 1 or 0.5 weight %) of one or more monosaccharides.

In some embodiments, the monosaccharide will be derived from any of a variety of wood and non-wood sources through a number of processes to separate monosaccharide from cellulose pulp. The distinction between wood and non-wood sources of monosaccharides is known in the art and is not further delineated herein. In a particularly useful embodiment, the monosaccharide may be derived from a non-wood source. In another embodiment, greater than 80 or 85 or 90 or 95 or 99 weight % of the monosaccharide may be derived from a non-wood source. In still a further embodiment, substantially all of the monosaccharide may be derived from a non-wood source. Particularly useful non-wood sources of monosaccharide may include agricultural products and grasses and may include species identified as sources of hemicellulose, such as wheat straw, rice straw, barley straw, oat straw, rye grass, coastal bermuda grass, arundo donax, miscanthus, bamboo, sorghum, banana harvest residue, pineapple residue, sugarcane bagasse, hemp, kenaf, switchgrass, succulents, alfalfa, corn stover, and, flax straw. Monosaccharide from wood sources may include monosaccharides derived from hardwood and softwood species.

In one embodiment, the monosaccharide and at least one of the hemicellulose and lignin may be derived from the same source, which may be a non-wood or wood source or blend thereof. In another embodiment, the monosaccharide, hemicellulose and lignin may be derived from the same source. In a particularly useful embodiment, the monosaccharide, hemicellulose and lignin are derived from a non-wood source.

In some embodiments, the monosaccharide may comprise one of glucose (dextrose), fructose (levulose), galactose, ribose, xylose, mannose, galactose, rhamnose, and arabinose and blends thereof. In some embodiments, the oligosaccharide may comprise two or more of glucose (dextrose), fructose (levulose), galactose, ribose, xylose, mannose, galactose, rhamnose, and arabinose.

While the present invention contemplates that the components of the solids in the present dispersion may be derived from wood and non-wood sources, the present invention may be practiced using synthetic sources of lignin, hemicellulose and/or monosaccharide.

As mentioned above, the solids component of the dispersion may also include an amount of inorganic content derived from biomass or the processing of biomass. Although there may be a certain amount of inorganics present, the process does not contribute any heavy metals or toxic metals to the dispersion. In certain embodiments, the solids component of the dispersion contains a certain amount of ash which contains a certain amount of inorganic content. In further embodiments, the solids component of the dispersion may include about 30 weight percent ash or less than 30 weight percent ash. In some embodiments, inorganic content of the solids may be from about 10 to about 20 weight percent. In other embodiments inorganic content may contribute from about 40 to about 50 weight percent to the solids. Sulfur content within the ash may not contribute more than 500 ppm of the solids.

Below is a table showing the inorganic mineral profile of wheat straw. As shown within the table below, no heavy metals and no toxic metals are present within the dispersion.

TABLE 1

Mineral Profile of Wheat Straw

| ATOMIC NUMBER | ELEMENT NAME | ELEMENT SYMBOL | Lignin 30% Solids ug/g |
| --- | --- | --- | --- |
| 1 | Hydrogen | H | NA |
| 2 | Helium | He | NA |
| 3 | Lithium | Li | 0.2 |
| 4 | Beryllium | Be | <0.1 |
| 5 | Boron | B | <20 |
| 6 | Carbon | C | NA |
| 7 | Nitrogen | N | NA |
| 8 | Oxygen | O | NA |
| 9 | Fluorine | F | NA |
| 10 | Neon | Ne | NA |
| 11 | Sodium | Na | 24600 |
| 12 | Magnesium | Mg | 360 |
| 13 | Aluminum | Al | 216 |
| 14 | Silicon | Si | 1643 |
| 15 | Phosphorus | P | 389 |
| 16 | Sulfur | S | 370 |
| 17 | Chlorine | Cl | NA |
| 18 | Argon | Ar | NA |
| 19 | Potassium | K | 2640 |
| 20 | Calcium | Ca | 1320 |
| 21 | Scandium | Sc | 1 |
| 22 | Titanium | Ti | 16 |
| 23 | Vanadium | V | 0.8 |
| 24 | Chromium | Cr | 1.3 |
| 25 | Manganese | Mn | 45 |
| 26 | Iron | Fe | 246 |
| 27 | Cobalt | Co | 0.2 |
| 28 | Nickel | Ni | 2 |
| 29 | Copper | Cu | 30 |
| 30 | Zinc | Zn | 24 |
| 31 | Gallium | Ga | <1 |
| 32 | Germanium | Ge | <1 |
| 33 | Arsenic | As | <0.1 |
| 34 | Selenium | Se | <0.1 |
| 35 | Bromine | Br | NA |
| 36 | Krypton | Kr | NA |
| 37 | Rubidium | Rb | 0.6 |

TABLE 1-continued

Mineral Profile of Wheat Straw

| ATOMIC NUMBER | ELEMENT NAME | ELEMENT SYMBOL | Lignin 30% Solids ug/g |
|---|---|---|---|
| 38 | Strontium | Sr | 8 |
| 39 | Yttrium | Y | 0.1 |
| 40 | Zirconium | Zr | <1 |
| 41 | Niobium | Nb | <1 |
| 42 | Molybdenum | Mo | 0.1 |
| 43 | Technetium | Tc | NA |
| 44 | Ruthenium | Ru | NA |
| 45 | Rhodium | Rh | <1 |
| 46 | Palladium | Pd | <1 |
| 47 | Silver | Ag | <1 |
| 48 | Cadmium | Cd | 0.1 |
| 49 | Indium | In | <1 |
| 50 | Tin | Sn | 1 |
| 51 | Antimony | Sb | <1 |
| 52 | Tellurium | Te | <1 |
| 53 | Iodine | I | NA |
| 54 | Xenon | Xe | NA |
| 55 | Cesium | Cs | <1 |
| 56 | Barium | Ba | 19 |
| 57 | Lanthanum | La | 0.1 |
| 58 | Cerium | Ce | 0.3 |
| 59 | Praseodymium | Pr | <0.1 |
| 60 | Neodymium | Nd | 0.1 |
| 61 | Promethium | Pm | NA |
| 62 | Samarium | Sm | <0.1 |
| 63 | Europium | Eu | <0.1 |
| 64 | Gadolinium | Gd | <0.1 |
| 65 | Terbium | Tb | <0.1 |
| 66 | Dysprosium | Dy | <0.1 |
| 67 | Holmium | Ho | <0.1 |
| 68 | Erbium | Er | <0.1 |
| 69 | Thulium | Tm | <0.1 |
| 70 | Ytterbium | Yb | <0.1 |
| 71 | Lutetium | Lu | <0.1 |
| 72 | Hafnium | Hf | <0.1 |
| 73 | Tantalum | Ta | <0.1 |
| 74 | Tungsten | W | <0.5 |
| 75 | Rhenium | Re | <1 |
| 76 | Osmium | Os | NA |
| 77 | Iridium | Ir | NA |
| 78 | Platinum | Pt | <0.1 |
| 79 | Gold | Au | <0.1 |
| 80 | Mercury | Hg | <0.1 |
| 81 | Thallium | Tl | <0.1 |
| 82 | Lead | Pb | 1 |
| 83 | Bismuth | Bi | <0.1 |
| 90 | Thorium | Th | <0.1 |
| 92 | Uranium | U | <0.1 |

NA - element not analyzed or quantified by the ICP-AES/ICP-MS scans performed.

Liquid Medium

The liquid medium into which the solids may be stably dispersed may, in many useful embodiments, comprise water. In some embodiments, the liquid medium may comprise 50% by volume (or 60 or 70 or 80 or 90 or 95 or 99% by volume) water. In some embodiments, the liquid medium may consist essentially of water.

In still other embodiments, the liquid medium may comprise up to 10% by volume of a water miscible alcohol. In still another embodiment, the liquid medium may comprise less than 5% by volume (or 2.5 or 1% by volume) with respect to the liquid medium of a C1-C10 alcohol. In some embodiments, the liquid medium may be substantially free of a water miscible alcohol or a C1-C10 alcohol.

Dispersion

While it is contemplated that the dispersions of the present invention will comprise the stable dispersion of solids as described above in a liquid medium also as described above, further characteristics of the dispersions of the invention may include the following. The dispersion may comprise sulfur in an amount not more than 500 parts per million (ppm) (or 200, or 100 or 50 ppm). In some embodiments, the dispersion may be substantially free of sulfur. In some instances, the dispersion may comprise sulfur, wherein the source of the sulfur is the same as the source of the lignin. In this respect, sulfur derived from wood or non-wood pulp sources may be included in the dispersion.

The dispersions of the present invention will further be substantially free of anthraquninone (anthracenedione). Anthraquinone is often utilized in the processing of wood and non-wood pulp sources.

The dispersions of the present invention may be alkaline, that is, having a pH greater than 7.0. In some embodiments, the pH may be greater than 7.8 or 8.0 or 8.2 or 8.5. In some embodiments, the pH of the dispersion may be between about 8 and about 11. In order to increase the pH of the dispersion to the desired alkaline range, the dispersion may comprise basic compounds in an amount suitable to adjust the pH of the dispersion. A variety of basic compounds may be used. Exemplary basic compounds agents may include alkali metal carbonate and bicarbonate, such as sodium bicarbonate and calcium carbonate, hydroxide ion sources as alkali metal hydroxides, including, without limitation, sodium hydroxide, lithium hydroxide, and potassium hydroxide.

The dispersions of the present invention may be prepared by mixing the solids and liquid medium in a suitable container and blending or agitating the mixture until the stable dispersion is achieved. As noted above, the pH of the dispersion may be modified by addition of a suitable basic compound.

In another embodiment, the dispersion of the present invention may derive from the processing of wood or non-wood pulp source materials. While many processes for separating cellulose from lignin and hemicellulose are known, the present invention is directed to dispersions comprising the lignin and hemicellulose byproducts of such processes. It is known that some processes for separating cellulose from lignin and hemicellulose involve dissolving lignin and hemicellulose from wood or non-wood sources using a liquid medium of some sort; however, these byproducts will typically exceed one or more of the sulfur, anthraquinone, or pH limits taught herein. Moreover, pulping processes that involve use of high temperatures (greater than about 150° C. typically yield byproducts that evidence high levels of highly condensed lignin.

In still another embodiment, the fluid medium of the dispersion of the present invention may comprise a portion of the fluid used in processing the wood or non-wood source from which at least a portion of the solids in the dispersion was derived. In some embodiments, substantially all of the fluid medium may be drawn from the fluid used in processing the wood or non-wood source from which substantially all of the solids in the dispersion was derived.

Industrial Application

The dispersions of the present invention may find useful application in a variety of areas, including, without limitation, dust suppression, de-icing, animal feed, binders, emulsifiers, agricultural adjuvant, cement or concrete additives, asphalt formulation, metal sequestration, film formation, plastic filler, carbon black, resins, and soil stabilization. The stability of the dispersion facilitates long term storage and shipment.

Measurement of Degree of Condensation in Lignin Samples—Q-13C NMR Results

The degree of condensation in each tested lignin sample is as follows: Soda lignin>WSL (wheat straw liquor) Concentrated>Lignosulfonate.

There are several methods which have been developed to measure degree of condensation in lignin. Most popular chemical method is the alkaline-nitrobenzene oxidation (NBO) method. In this method, non-condensed portion in lignin is oxidatively degraded to convert simple monomers like p-hydroxybenzaldehyde, vanillin and syringaldehyde as well as corresponding aromatic acids (p-hydroxybenzoic acid, vanillic acid and syringic acid). More condensed lignin provides less such degradation monomers after NBO. The degree of condensation in a lignin can be calculated by quantification of these NBO monomers. On the other hand, quantitative 13C nuclear magnetic resonance (NMR) spectroscopy method is also useful to estimate the level of condensation in lignin. Most of carbon signals in lignin on the 13C-NMR spectrum have been assigned and reported in previous literatures (See Capanema, Balakshin et al. 2004, Capanema, Balakshin et al. 2005, Holtman, Chang et al. 2006, Sannigrahi, Ragauskas et al. 2009 referenced below). These two common analytical methods were applied to the tested samples to estimate the degree of condensation. In this report, the results from the quantitative 13C-NMR is mentioned.

Figure 1:
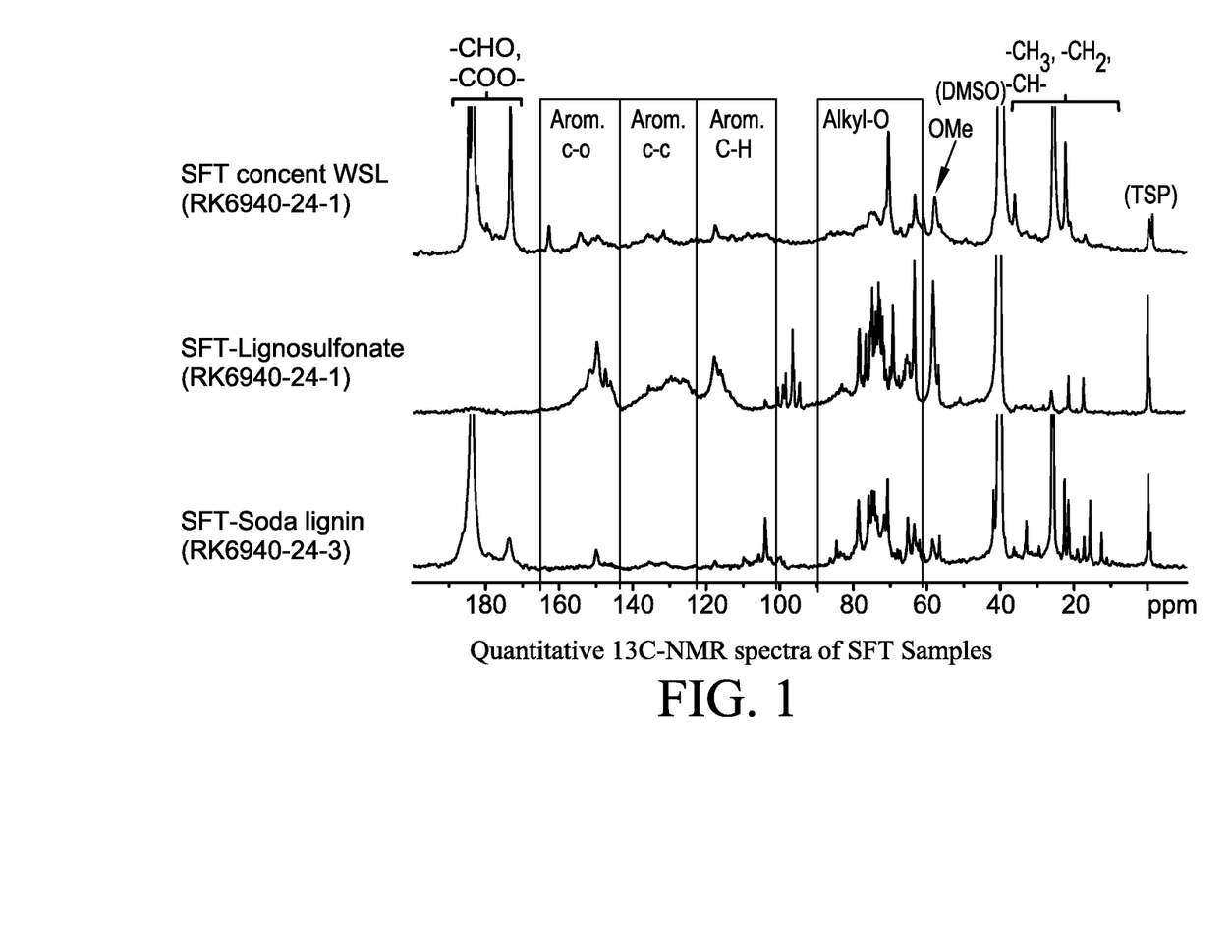
FIG. 1 is a graph showing the functional group peaks within the NMR spectra of the several tested samples.

Three lignin samples were analyzed by the quantitative 13C-NMR. These spectra are shown in FIG. 1. Peaks were assigned according to 13C-NMR data of several lignin samples reported in literatures mentioned above. Wheat straw liquor (WSL) has less aliphatic peaks (alkyl groups) at 10-40 ppm, while the soda lignin has them more. The methoxyl peak, appearing at 56-58 ppm, in lignosulfonate is largest in the three samples. Alkoxy groups in lignin sidechains in WSL appeared at 60-90 ppm, which includes lignin side chain at Cα, Cβ and Cγ, and have the lowest intensity, suggesting that lignin sidechains in WSL were more degraded reductively or oxidatively. Tertiary carbon peaks (C—H), carbon-carbon (C—C) and oxygenated carbon (C—O) in aromatics appear at 102-124, 124-142, and 142-166 pm, respectively. Relative abundance of each functional group (per in aryl ring) were calculated based on six carbon on the aromatic ring (102-166 ppm) (Table 1). It was observed that lignosulfonate and WSL have similar abundance of aromatic C—C bonds (0.34/Ar and 0.31/Ar, respectively), while soda lignin has lower with 0.21/Ar. Contrastively, the content of tertiary aromatic C—H peaks in soda lignin is largest, that in WSL is second and lignosulfonate is lowest, leading to replacement of C—H bonds with C—C bonds. This data suggests that the degree of condensation in each sample is as follows: Lignosulfonate>concent. WSL>>soda lignin.

Carbonyl peaks in aldehydes, esters and carboxylic acid appear at 170-190 ppm. WSL has largest carbonyl peaks, which could be attributed to higher portion of benzaldehydes and benzyl esters.

TABLE 2

Relative abundance of functional groups (per in aryl ring) in quantitative 13C-NMR spectra of tested lignin samples.

| δ (ppm) | Assignment | WSL | Lignosulfonate | Soda lignin |
|---|---|---|---|---|
| 166-142 | Aromatic C—O | 0.25 | 0.36 | 0.24 |
| 142-124 | Aromatic C—C | 0.31 | 0.34 | 0.21 |
| 124-102 | Aromatic C—H | 0.44 | 0.30 | 0.54 |
| 90-58 | Alkyl-O | 1.09 | 0.88 | 3.01 |

FIG. 1: Wheat straw lignin contains uniquely high functional groups of aldehyde, esters, and carboxylic acids, and is less condensed via carbon-carbon bonding than lignosulfonates.

REFERENCES

Capanema, E. A., et al. (2004). "A comprehensive approach for quantitative lignin characterization by NMR spectroscopy." Journal of Agricultural and Food Chemistry 52(7): 1850-1860.

Capanema, E. A., et al. (2005). "Quantitative characterization of a hardwood milled wood lignin by nuclear magnetic resonance spectroscopy." Journal of Agricultural and Food Chemistry 53(25): 9639-9649.

Holtman, K. M., et al. (2006). "Quantitative 13C NMR characterization of milled wood lignins isolated by different milling techniques." Journal of Wood Chemistry and Technology 26(1): 21-34.

Sannigrahi, P., et al. (2009). "Lignin structural modifications resulting from ethanol organosolv treatment of loblolly pine" Energy & Fuels 24(1): 683-689.

The references noted above, namely Capanema (2004), Capanema (2005), Holtman and Sannigrahi are herein incorporated by reference in their entireties.

Measurement of Degree of Condensation in Lignin Samples—NBO Results

The degree of condensation in each tested lignin sample is as follows: Soda lignin>WSL (wheat straw liquor) Concentrated>Lignosulfonate.

Results & Discussion:

There are several methods to measure the degree of condensation in lignin. The most popular chemical method is alkaline-nitrobenzene oxidation (NBO). In this method, non-condensed lignin is oxidatively degraded to simple monomers like p-hydroxybenzaldehyde, vanillin and syringaldehyde as well as corresponding aromatic acids (p-hydroxybenzoic acid, vanillic acid and syringic acid). More condensed lignin provides less such degradation monomers after NBO. The degree of lignin condensation can be calculated by quantification of these NBO monomers. (See Leopold 1952 referenced below).

Figure 2:
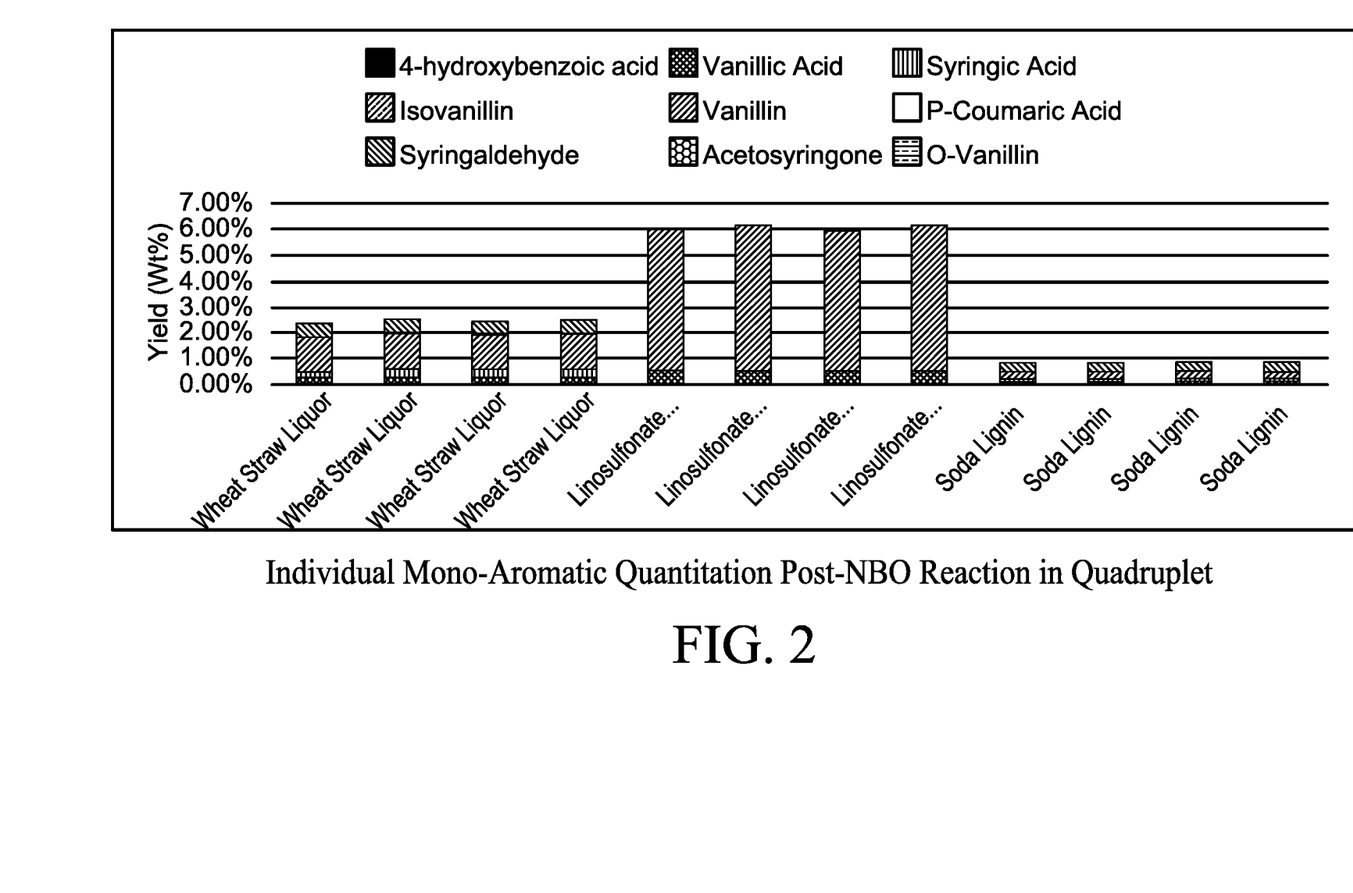
FIG. 2 is a graph showing the mono-aromatic quantitation post-NBO reaction in quadruplet (duplicate NBO reactions with duplicate workup).

Three samples were treated via NBO and analyzed by quantitative LC/MS. FIG. 2 shows the mono-aromatic quantitation post-NBO reaction in quadruplet (duplicate NBO reactions with duplicate workup). The mono-aromatic content was averaged as 2.44±0.08% for WSL concentrate, 6.11±0.13% for Lignosulfonate, and 0.82±0.01% for Soda Lignin (wt. % of freeze dried starting material). Of important note, the NBO and subsequent LC/MS quantitation produced reproducible data as indicated by the standard deviation.

Mono-aromatic compounds released from the β-O-4 lignin bonds in the NBO reaction are an indication of condensation after the total lignin was accounted for, so that the three samples could be directly compared. From the compositional results performed on the three samples, the total lignin content (combining both the solids and liquors lignin content) was as follows: 14.96% for WSL concentrate, 24.89% for Lignosulfonate, and 23.75% for Soda Lignin. Of this lignin content, 83.69% was condensed in the WSL concentrate sample, 75.45% was condensed in the Lignosulfonate sample, and 96.55% was condensed in the Soda Lignin sample. Therefore, the Lignosulfonate sample was calculated to have the least amount of condensation, followed by WSL concentrate, and Soda Lignin contained the most lignin condensation.

FIG. 2: After NBO oxidation, wheat straw lignin contained more monomers than soda lignin, indicating less condensation in the lignin.

REFERENCES

Leopold, B. (1952). "Studies on Lignin: III. Oxidation of wood from *Picea abies* (L.) Karst. (Norway Spruce) with Nitrobenzene and Alkali". Acta Chemica Scandinavica 6:38-48.

The reference noted above (Leopold) is herein incorporated by reference in its entirety.

Thioacidolysis Report: Tested Samples

Method

Thioacidolysis is a method to measure the relative content of lignin monomers bound by β-O-4 linkages. The process of thioacidolysis involves the cleavage of β-O-4 linkages to generate thioethylated H, G and S monomers. Thioacidolysis was performed on 2 mg of ground sample as received, as reported in Harman-Ware et al., herein incorporated by reference in its entirety:

Harman-Ware, A. E.; Foster, C.; Happs, R. M.; Doeppke, C.; Meunier, K.; Gehan, J.; Yue, F.; Lu, F.; Davis, M., Quantitative Analysis of Lignin Monomers by a Thioacidolysis Method Tailored for Higher-Throughput Analysis. Biotechnology Journal 2016, 11, 1268-1273.

Results/Discussion

TABLE 3

Thioacidolysis yields for tested samples. Parentheses give standard deviation for n = 2 reaction replicates.

|  | H μmol/g sample | S μmol/g sample | G μmol/g sample | Sum μmol/g sample | S/G |
|---|---|---|---|---|---|
| WSL Conc. 6649-024-1 | BQL | 27.4 (±2.7) | 29.2 (±3.0) | 56.6 (±5.7) | 0.9 (±0.0) |
| Lignosulfonate Alkaline 6649-024-2 | 0 | BQL | BQL | BQL | — |
| Soda Lignin | 0 | BQL | 24.0 (±0.0) | >24.0 | — |

BQL = below quantifiable limit, trace analyte detected

The samples gave very low yields of thioethylated monomers (and subsequently relatively high standard deviation), indicating either a low abundance of linear aryl ether (i.e., (3-0-4) linkages and/or a high abundance of condensed linkages, but may also indicate the presence of components limiting reaction efficiency.

The reference standard (poplar) had yield and S/G within historical limits. Typical thioacidolysis yields are on the order of 400 μmol/g biomass sample (or around 1000 μmol/g Klason lignin). Wheat straw lignin typically has S/G 1. "WSL Conc. 6649-024-1" was sticky as opposed to powder solid.

TABLE 4

| | Sample ID | % TS Slurry | % TS liqour | FIS (dry solids/ Dry Slurry | FIS (Dry solids/ Wet slurry | dry Slurry (g) (slurry mass balance) | water (g) | Washed Solids (g) (solids mass balance) | Wet Liquors (g) | Wet Liquors (L) | Dry Liquor (g) (filtered liquor mass balance) |
|---|---|---|---|---|---|---|---|---|---|---|---|
| As measured | lignin sulfonate | 51.82% | 55.57% | 0.00% | 0.00% | 51.82 | 48.18 | — | 100.00 | 0.12 | 55.57 |
| | Wheat concentrate | 21.80% | 21.43% | 2.18% | 0.47% | 21.80 | 78.20 | 0.47 | 99.53 | 0.11 | 21.33 |
| | Soda Lignin | 39.95% | 38.15% | 7.30% | 2.92% | 39.95 | 60.05 | 2.92 | 97.08 | 0.12 | 37.03 |
| | UHP alkaline liquor | 8.36% | 7.50% | 0.00% | 0.00% | 8.36 | 91.64 | — | 100.00 | 0.10 | 7.50 |
| g constituent/ g wet slurry | lignin sulfonate Wheat concentrate Soda Lignin UHP alkaline liquor | | | | | | | | | | |

Dry liquor lignin sulfonate and dry liquor UHP alkaline liquor samples likely retained water even after lengthy drying period and remained sticky.

TABLE 5

| | Sample ID | % Ash | % Protein | % Lignin | % Glucan | % Xylan | % Galactan | % Arabinan | % Fructan | % Acetate | Total % |
|---|---|---|---|---|---|---|---|---|---|---|---|
| As measured | lignin sulfonate | 0.00 | 0.00 | 0.00 | 0.00 | 0.00 | 0.00 | 0.00 | 0.00 | 0.00 | 0.00 |
| | Wheat concentrate | 75.00 | 0.00 | 14.59 | 3.87 | 0.22 | 0.00 | 0.50 | 0.00 | 0.20 | 94.38 |

TABLE 5-continued

| | | Solids Analysis | | | | | | | | | |
|---|---|---|---|---|---|---|---|---|---|---|---|
| | Sample ID | % Ash | % Protein | % Lignin | % Glucan | % Xylan | % Galactan | % Arabinan | % Fructan | % Acetate | Total % |
| | Soda Lignin | 17.17 | 0.00 | 47.83 | 14.30 | 1.92 | 1.35 | 0.76 | 0.00 | 0.19 | 83.53 |
| | UHP alkaline liquor | 0.00 | 0.00 | 0.00 | 0.00 | 0.00 | 0.00 | 0.00 | 0.00 | 0.00 | 0.00 |
| g constituent/ | lignin sulfonate | 0.00 | 0.00 | 0.00 | 0.00 | 0.00 | 0.00 | 0.00 | 0.00 | 0.00 | 0.00 |
| g wet slurry | Wheat concentrate | 0.36 | 0.00 | 0.07 | 0.02 | 0.00 | 0.00 | 0.00 | 0.00 | 0.00 | 0.45 |
| | Soda Lignin | 0.50 | 0.00 | 1.40 | 0.42 | 0.06 | 0.04 | 0.02 | 0.00 | 0.01 | 2.44 |
| | UHP alkaline liquor | 0.00 | 0.00 | 0.00 | 0.00 | 0.00 | 0.00 | 0.00 | 0.00 | 0.00 | 0.00 |

TABLE 6

| | | | | | Liquor Analysis | | | | | | |
|---|---|---|---|---|---|---|---|---|---|---|---|
| | | | | | | Monomeric carbohydrates | | | | | Total carbohydrates |
| | Sample ID | Density (g/ml) | Undiluted pH | Lignin (mg/ml) | Cellobiose (mg/ml) | Glucose (mg/ml) | Xylose (mg/ml) | Galactose (mg/ml) | Arabinose (mg/ml) | Fructose (mg/ml) | Glucose (mg/ml) |
| As measured | lignin sulfonate | 1.243 | 3.93 | 52.62667 | 0.0 | 0.0 | 3.1 | 7.2 | 1.3 | 0.0 | 21.6 |
| | Wheat concentrate | 1.0888 | 9.34 | 13.37667 | 0.0 | 0.0 | 0.0 | 0.0 | 0.0 | 0.0 | 0.0 |
| | Soda Lignin | 1.1939 | 6.91 | 14.98333 | 0.0 | 0.0 | 0.5 | 0.1 | 0.1 | 0.0 | 3.4 |
| | UHP alkaline liquor | 1.0168 | 11.66 | 3.998333 | 0.0 | 0.0 | 0.0 | 0.0 | 0.0 | 0.0 | 1.3 |
| g constituent/ | lignin sulfonate | | | 4.2 | 0.0 | 0.0 | 0.2 | 0.6 | 0.1 | 0.0 | 1.7 |
| g wet slurry | Wheat concentrate | | | 1.2 | 0.0 | 0.0 | 0.0 | 0.0 | 0.0 | 0.0 | 0.0 |
| | Soda Lignin | | | 1.2 | 0.0 | 0.0 | 0.0 | 0.0 | 0.0 | 0.0 | 0.3 |
| | UHP alkaline liquor | | | 0.4 | 0.0 | 0.0 | 0.0 | 0.0 | 0.0 | 0.0 | 0.1 |

| | | Liquor Analysis | | | | | | | | |
|---|---|---|---|---|---|---|---|---|---|---|
| | | Total carbohydrates | | | | Organic Acids after hydrolysis | | | | |
| | | | | | | Lactic | | Acetic | | | |
| | Sample ID | Xylose (mg/ml) | Galactose (mg/ml) | Arabinose (mg/ml) | Fructose (mg/ml) | Acid (mg/ml) | Glycerol (mg/ml) | Acid (mg/ml) | Ethanol (mg/ml) | HMF (mg/ml) | Furfural (mg/ml) |
| As measured | lignin sulfonate | 9.2 | 8.9 | 0.0 | 0.0 | 0.7 | 0.0 | 9.1 | 0.0 | 0.0 | 0.0 |
| | Wheat concentrate | 0.4 | 0.3 | 1.5 | 0.0 | 20.2 | 0.0 | 46.0 | 0.0 | 0.0 | 0.0 |
| | Soda Lignin | 4.0 | 2.4 | 4.5 | 0.0 | 28.3 | 0.0 | 154.2 | 0.0 | 0.0 | 0.0 |
| | UHP alkaline liquor | 2.8 | 1.5 | 1.5 | 0.0 | 1.2 | 0.0 | 10.0 | 0.0 | 0.0 | 0.0 |
| g constituent/ | lignin sulfonate | 0.7 | 0.7 | 0.0 | 0.0 | 0.1 | 0.0 | 0.7 | 0.0 | 0.0 | 0.0 |
| g wet slurry | Wheat concentrate | 0.0 | 0.0 | 0.1 | 0.0 | 1.8 | 0.0 | 4.2 | 0.0 | 0.0 | 0.0 |
| | Soda Lignin | 0.3 | 0.2 | 0.4 | 0.0 | 2.3 | 0.0 | 12.5 | 0.0 | 0.0 | 0.0 |
| | UHP alkaline liquor | 0.3 | 0.2 | 0.1 | 0.0 | 0.1 | 0.0 | 1.0 | 0.0 | 0.0 | 0.0 |

TABLE 7

| | Sample ID | Filtered Liquor Mass Balance | Slurry Mass Balance |
|---|---|---|---|
| As measured | lignin sulfonate | | |
| | Wheat concentrate | | |
| | Soda Lignin | | |
| | UHP alkaline liquor | | |
| g constituent/ | lignin sulfonate | 9.1 | 9.1 |
| g wet slurry | Wheat concentrate | 7.5 | 7.9 |
| | Soda Lignin | 17.3 | 19.7 |
| | UHP alkaline liquor | 2.2 | 2.2 |

Tables 4-7: UHP alkaline liquor is another non-wood liquor dispersion using the same process as the wheat concentrate. The wheat concentrate was concentrated under vacuum using conditions identical to the commercial process. All analyses completed using NREL Biomass Laboratory Analytical Procedures.

Notes—Tables 4 through 7

Government testing procedures are not optimized for alkaline samples.

Mass closure for the solids analyses are within expectations.

Liquor analysis has lower mass closure compared with mass balance expectations.

Liquor analysis does not capture salts, proteins, or components not specifically listed.

Solids Analysis for lignin sulfonate, wheat concentrate, soda lignin and UHP alkaline liquor are included in the mass balance. (See Table 4)

Liquor Analysis for lignin sulfonate, wheat concentrate, soda lignin and UHP alkaline liquor are included in the mass balance. (See Table 5)

Total % Solids Analysis for lignin sulfonate, wheat concentrate, soda lignin and UHP alkaline liquor correspond to solids mass balance. (See Table 6)

While the stable aqueous dispersion and associated compositions have been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the stable aqueous dispersion and associated compositions should not be limited to any single embodiment, but rather construed in breadth and scope in accordance with the recitations of the appended claims.

Having thus described the invention, it is now claimed:

I claim:

1. A stable aqueous dispersion comprising:
    solids in an amount from 10 to 50 weight % (or optionally, 10 to 40 or 15 to 35 or 20 to 35 weight %), with respect to the total weight of the dispersion, stably dispersed in a liquid medium;
    wherein the solids comprise
        (i) lignin in an amount of at least 10 weight % (or optionally, 20 or 30 or 40 or 50 weight %) of the solids wherein the lignin comprises less than 90 weight % (or optionally, 80 or 70 weight %) of condensed oligomers/polymers, and 10% weight % (or optionally, 20 or 30 weight %) of non-condensed monomers/oligomers/polymers, and
        (ii) hemicellulose in an amount of at least 1 weight % (or optionally, 5 or 10 or 20 or 30 or 40 weight %) of the solids, and
        less than 5 weight percent % (or optionally, 2.5 or 1 or 0.5 weight %) of the solids of a monosaccharide,
    wherein the liquid medium comprises water,
    wherein the dispersion comprises less than 500 parts per million (ppm) (or optionally, 200, or 100 or 50 ppm) of sulfur, and
    wherein the dispersion is substantially free of anthraquinone.

2. The dispersion of claim 1, wherein the dispersion is alkaline.

3. The dispersion of claim 2, wherein the dispersion has a pH in the range of 8.0 to 11.0.

4. The dispersion of claim 1, wherein the liquid medium comprises less than 5% by volume (or optionally, 2.5 or 1% by volume) with respect to the liquid medium of a C1-C10 alcohol.

5. The dispersion of claim 1, wherein at least 90 weight % (or optionally, 95 or 97 or 98 or 99 weight %) of the solids are derived from a non-wood source.

6. The dispersion of claim 5, wherein substantially all of the solids are derived from a non-wood source.

7. The dispersion of claim 5, wherein the non-wood source is selected from the group consisting of wheat straw, rice straw, barley straw, oat straw, rye grass, coastal bermuda grass, arundo donax, miscanthus, bamboo, sorghum, banana harvest residue, pineapple residue, nut shell residue, sugarcane bagasse, industrial hemp, recreational cannabis waste, kenaf, switchgrass, succulents, alfalfa, corn stover, and, flax straw.

8. A liquor composition derived from processing non-wood agricultural materials, comprising:
    from 10 to 50 weight % (or optionally, 10 to 40 or 15 to 35 or 20 to 35 weight %) with respect to the total weight of the composition, solids stably dispersed in a liquid medium;
    wherein the solids comprise—
        (i) lignin in an amount of at least 10 weight % (or optionally, 20 or 30 or 40 or 50 weight %) of the solids wherein the lignin comprises less than 90 weight % (or optionally, 80 or 70 weight %) of condensed oligomers/polymers, and 10% weight % (or optionally, 20 or 30 weight %) of monomers and noncondensed oligomers/polymers,
        (ii) hemicellulose in an amount of at least 1 weight % (or optionally, 5 or 10 or 20 or 30 or 40 weight %) of the solids, and
        (iii) less than 5 weight percent % (or optionally, 2.5 or 1 or 0.5 weight %) of the solids of a monosaccharide,
    wherein the liquid medium comprises—
        a. water, and
        b. less than 5% by volume (or optionally, 2.5 or 1% by volume) with respect to the liquid medium of a C1-C10 alcohol,
    wherein the dispersion comprises less than 500 parts per million (ppm) (or optionally, 200, or 100 or 50 ppm) of sulfur,
    wherein the dispersion is substantially free of anthraquinone, and
    wherein the dispersion is alkaline.

* * * * *